United States Patent Office 3,215,755
Patented Nov. 2, 1965

3,215,755
SILICATE CONTAINING COMPOSITIONS FOR LEATHER TREATMENT
Charles F. Dudley, Sydney, New South Wales, Australia, assignor to Dow Corning Corporation, Midland, Mich., a corporation of Michigan
No Drawing. Filed Aug. 5, 1963, Ser. No. 300,090
6 Claims. (Cl. 260—825)

This invention relates to a new composition which contains an alkyl orthosilicate and is useful for rendering leather water resistant.

This application is a continuation-in-part of applicant's copending application Serial No. 53,893, filed September 6, 1960, now abandoned.

Certain organosilicon compositions containing titanium esters of zirconium esters are well known for rendering leather water resistant. The primary object of this invention is to provide another type of organosilicon composition for rendering leather water resistant. Another object is to provide such a composition employing an alkyl orthosilicate. Other objects and advantages will be apparent from the following description.

This invention relates to a composition of matter consisting essentially of a mixture of (1) from 2 to 60 percent preferably from 2 to 20 percent by weight of an orthosilicate of the formula $Si(OR)_4$ in which each R is an alkyl radical of less than 5 carbon atoms, (2) from 5 to 70 percent by weight of a methylpolysiloxane resin composed of trimethylsiloxane units and $SiO_2$ units in such proportion that the ratio of methyl to silicon ratio ranges from about 0.8:1 to about 1.5:1 and (3) from 15 to 80 percent by weight of a polysiloxane composed essentially of units of the formula

$$Z_nSiO_{\frac{4-n}{2}}$$

in which each Z is a monovalent hydrocarbon radical of less than 7 carbon atoms, each $n$ has a value of from 1 to 3 and $n$ has an average value of from 2 to 2.9.

The alkyl orthosilicates suitable for employment in the compositions of this invention are those esters having the general formula $Si(OR)_4$ in which each R can be any alkyl radical of less than 5 carbon atoms. more specifically, R can be, for example, a methyl, ethyl, n-propyl, isobutyl, n-butyl, isobutyl or t-butyl radical.

The compositions of ingredients (2) and (3) in the method of this invention are well known in the art. The methylpolysiloxane resins (2) which are employed herein are composed essentially of trimethylsiloxane units and $SiO_2$ units but may contain traces of dimethylsiloxane units and/or monomethylsiloxane units. These copolymers may be prepared by cohydrolyzing $Me_3SiX$ and $SiX_4$ where X is a hydrolyzable radical. Another method by which these materials may be prepare is that of reacting the methylchlorosilanes, methylalkoxylsilanes or hexamethyldisiloxane with an acidic silica sol. Regardless of the method employed the ratio of methyl radicals to silicon radicals in the copolymer must be from 0.8:1 to 1.5:1 with the preferred range being from about 1:1 to about 1.3:1.

Organopolysiloxanes (3) which are operative herein include those in which Z is any monovalent hydrocarbon radical having less than 7 carbon atoms such as, for example, the phenyl, methyl, ethyl, propyl, vinyl, allyl, cyclohexyl, cyclopentenyl and t-butyl radicals. Consequently, specific examples of operative siloxanes (3) are dimethylsiloxane, vinylmethylsiloxane, vinylethylsiloxane, dipropylsiloxane, phenylmethylsiloxane, or any mixtures thereof and copolymers of any of these diorganosiloxanes with triorganosiloxanes such as, for example, trimethylsiloxane, phenyldimethylsiloxane, vinyldimethylsiloxane, hexenyldiethylsiloxane and amyldimethylsiloxane. Monorganosiloxane units can also be present in these siloxanes so long as the value of $n$ remains substantially in the range specified.

The organosiloxanes (3) are benzene-soluble materials which can vary in viscosity from thin fluids to deformable solids. Generally fluid polymers having a viscosity ranging from 5 to 100,000 cs. at 25° C. are preferred.

The compositions of this invention are prepared by merely mixing ingredients (1), (2) and (3). The mixing can be accomplished either with the essentially undiluted materials or by employing a common solvent such as, for example, toluene, benzene, xylene, petroleum hydrocarbons, Stoddard solvent, naphtha mineral spirits, perchloroethylene, methylene chloride or the like.

One of the primary uses of the compositions of this invention is that of rendering leather water resistant. This is accomplished preferably by employing a solvent solution of the siloxane using any solvents which are harmless to leather such as those specified above. The leather may be treated in any suitable manner such as by spraying, dipping or padding. Suitable results are obtained when the leather contains from .5 to 50 percent by weight of the siloxane compositions. In general, 2 to 25 percent by weight is preferred. Ordinarily, one application with a 25 percent solution of the composition of this invention in xylene or a 15 percent solution in perchloroethylene is sufficient to give the desired pickup.

The compositions of this invention improve the water resistance of any leather either tanned, tawed or otherwise cured and either finished or unfinished leather. They are applicable to leather from any type of animal such as horsehide, pigskin, kid, cowhide and the like.

The compositions of this invention are also useful as water repellent agents for glass surfaces, ceramic surfaces, wood surfaces and textiles.

The following examples illustrate the best method of using the composition of this invention. These examples should not be construed as limiting this invention the scope of which is properly delineated in the claims.

A measure of the water resistance of the leather is obtained by flexing the treated material on a Dow Corning Corporation Sylflex leather tester machine while immersed in water as described in "Industrial Laboratories," July, 1955, page 94. It has been found that leather to be commercially acceptable must withstand 4,000 flexes or must absorb less than 15 percent by weight water after 4,000 flexes if it cannot withstand 4,000 flexes. Due to the variation in leather from sample to sample, an average of several samples is taken in testing for commercial control.

EXAMPLE 1

In this example ingredient (1) was ethylorthosilicate, ingredient (2) was a copolymer of trimethylsiloxane units and $SiO_2$ units having a methyl-to-silicon ratio of about 1.2:1 and ingredient (3) was a trimethylsiloxy-end-blocked dimethylpolysiloxane fluid having a viscosity at 25° C. of 350 cs.

The base compositions of ingredients (1), (2) and (3) were employed as (A) a 25 percent by weight solution in xylene and (B) a 15 percent by weight solution in perchloroethylene. Cowhide samples were dipped into the respective solutions, were allowed to become saturated, were removed and air-dried from 48 hours to 480 hours. The amount of solids picked up was calculated as percent by weight solids based on the weight of the leather. The leather samples were then tested for water resistance on the Dow Corning Sylflex leather tester with the following results.

Table

| Base composition | | | Solution type | Average percent pickup | Average flexes | Percent $H_2O$ adsorp. |
|---|---|---|---|---|---|---|
| Percent (1) | Percent (2) | Percent (3) | | | | |
| 16.6 | 41.7 | 41.7 | A | 23.1 | 2,468 | 9.2 |
| | | | B | 22.6 | 2,896 | 7.1 |
| 8.4 | 45.8 | 45.8 | A | 26.0 | 2,506 | 9.0 |
| | | | B | 23.8 | 4,256 | 5.1 |

EXAMPLE 2

Equivalent results are obtained when the following siloxanes are substituted for ingredient (3) in Example 1:

A copolymer of 75 mol percent dimethylsiloxane and 25 mol percent phenylmethylsiloxane,
Vinylmethylsiloxane,
Diethylsiloxane,
Butylmethylsiloxane,
Allylmethylsiloxane,
A copolymer of vinyldimethylsiloxane and dimethylsiloxane and
A copolymer of phenyldimethylsiloxane and dimethylsiloxane.

EXAMPLE 3

Equivalent results are obtained when methyl orthosilicate, isopropyl orthosilicate and t-butyl orthosilicate are substituted for the ethylorthosilicate employed in Example 1.

EXAMPLE 4

A formulation was made by mixing 33⅓ percent by weight ethylorthosilicate, 33⅓ percent by weight of a copolymer of trimethylsiloxane units and $SiO_2$ units having a methyl to silicon ratio of about 1.2:1 and 33⅓ percent by weight of a trimethylsiloxy-endblocked dimethylpolysiloxane fluid having a viscosity of 350 cs. at 25° C. The mixture was dissolved in perchloroethylene to give a 15 percent by weight solution.

Duplicate runs were made with two different types of leather by dipping each leather sample into the solution and allowing it to air dry for 48 hours. The samples were tested as above with the following results.

| Leather sample | Flex values | Percent $H_2O$ absorp. |
|---|---|---|
| 1 | 65,000 / 3,520 | 13.3 |
| 2 | 84,000 / 54,000 | |

EXAMPLE 5

Equivalent results are obtained when the composition 20 percent by weight propylorthosilicate, 40 parts by weight of a copolymer of trimethylsiloxane units and $SiO_2$ units having a methyl to silicon ratio of about 1.2:1 and 40 percent by weight of 5000 cs. ethylmethylsiloxane fluid, is substituted in the procedure of Example 1.

That which is claimed is:

1. A composition of matter consisting essentially of a mixture of (1) from 2 to 20 percent by weight of a compound of the formula $Si(OR)_4$ in which each R is an aliphatic monovalent hydrocarbon radical of less than 5 carbon atoms, (2) from 5 to 70 percent by weight of a methylpolysiloxane resin composed of trimethylsiloxane units and $SiO_2$ units in such proportion that the ratio of methyl groups to silicon atoms ranges from about 0.8:1 to about 1.5:1 and (3) from 15 to 80 percent by weight of a polysiloxane composed essentially of units of the formula $$Z_n SiO_{\frac{4-n}{2}}$$

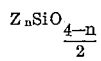

in which each Z is a monovalent hydrocarbon radical of less than 7 carbon atoms, each $n$ has a value of from 1 to 3 and $n$ has an average value of from 2 to 2.9.

2. The composition of claim 1 in which compound (1) is ethyl orthosilicate.

3. A composition of matter consisting essentially of a mixture of (1) from 2 to 60 percent by weight of a compound of the formula $Si(OR)_4$ in which each R is an aliphatic monovalent hydrocarbon radical of less than 5 carbon atoms, (2) from 5 to 70 percent by weight of a methylpolysiloxane resin composed of trimethylsiloxane units and $SiO_2$ units in such proportion that the ratio of methyl groups to silicon atoms ranges from about 0.8:1 to about 1.5:1 and (3) from 15 to 80 percent by weight of a polysiloxane composed essentially of units of the formula $$Z_n SiO_{\frac{4-n}{2}}$$

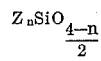

in which each Z is a monovalent hydrocarbon radical of less than 7 carbon atoms, each $n$ has a value of from 1 to 3 and $n$ has an average value of from 2 to 2.9.

4. The composition of claim 3 in which compound (1) is ethyl orthosilicate.

5. As an article of manufacture, leather containing from 5 to 50% by weight of a composition consisting essentially of a mixture of (1) from 2 to 60% by weight of a compound of the formula $Si(OR)_4$ in which each R is a aliphatic monovalent hydrocarbon radical of less than 5 carbon atoms, (2) from 5 to 70% by weight of a methylpolysiloxane resin composed of trimethylsiloxane units and $SiO_2$ units in such proportion that the ratio of methyl groups to silicon atoms ranges from about 0.8:1 to about 1.5:1 and (3) from 15 to 80% by weight of a polysiloxane consisting essentially of units of the formula $$Z_n SiO_{\frac{4-n}{2}}$$

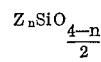

in which Z is a monovalent hydrocarbon radical of less than 7 carbon atoms each $n$ has a value from 1 to 3 and $n$ has an average value from 2 to 2.9.

6. An article in accordance with claim 5 in which (1) is ethylorthosilicate.

References Cited by the Examiner

UNITED STATES PATENTS

| Re. 23,879 | 9/54 | Currie | 260—825 |
| 2,473,260 | 6/49 | Rochow | 260—448.8 |
| 2,728,736 | 12/55 | Hunter et al. | 260—29.150 |
| 2,744,878 | 5/56 | Smith-Johannsen | 260—37 |
| 2,814,601 | 11/57 | Currie et al. | 260—29.1 |
| 2,911,327 | 11/59 | Dudley | 117—142 |
| 3,057,469 | 10/62 | Bond et al. | 260—825 |

MORRIS LIEBMAN, *Primary Examiner.*

ALEXANDER H. BRODMERKEL, *Examiner.*